United States Patent [19]
Porter

[11] Patent Number: 5,348,402
[45] Date of Patent: * Sep. 20, 1994

[54] BEARING WITH SPECIALLY SHAPED LANDS

[75] Inventor: James S. Porter, Valparaiso, Ind.

[73] Assignee: McGill Manufacturing Co., Inc., Valparaiso, Ind.

[*] Notice: The portion of the term of this patent subsequent to Apr. 6, 2010 has been disclaimed.

[21] Appl. No.: 42,413

[22] Filed: Apr. 2, 1993

Related U.S. Application Data

[63] Continuation-in-part of Ser. No. 825,950, Jan. 27, 1992, Pat. No. 5,199,798.

[51] Int. Cl.$^5$ ............................................. F16C 33/66
[52] U.S. Cl. ................................... 384/462; 384/482; 384/485; 384/513
[58] Field of Search ............... 384/462, 485, 513, 571, 384/569, 465, 482

[56] References Cited

U.S. PATENT DOCUMENTS

| | | | |
|---|---|---|---|
| 2,224,704 | 12/1940 | Stein . | |
| 3,008,559 | 11/1961 | Forster . | |
| 3,054,164 | 9/1962 | Recknagel . | |
| 3,494,681 | 2/1970 | Anderson et al. | 384/482 |
| 3,669,515 | 6/1972 | Nojima | 384/513 |
| 3,805,934 | 4/1974 | Labadie | 384/513 |
| 4,509,869 | 4/1985 | Johnston | 384/462 |

*Primary Examiner*—Lenard A. Footland
*Attorney, Agent, or Firm*—Leydig, Voit & Mayer, Ltd.

[57] ABSTRACT

A bearing assembly having coaxial inner and outer bearing races, a plurality of rolling elements which ride in respective raceways in the inner and outer races, and annular sealing elements interposed between the inner and outer races for defining annular lubricant containing chambers on opposed axial sides of the rolling elements. For facilitating circulation of lubricant between moving parts during use of the bearing, the outer bearing race is formed with lands which extend axially outwardly of the raceway with a slight radially inwardly directed taper relative to the bearing axis. In some embodiments, the tapered lands are formed with a convexly curved contour.

14 Claims, 3 Drawing Sheets

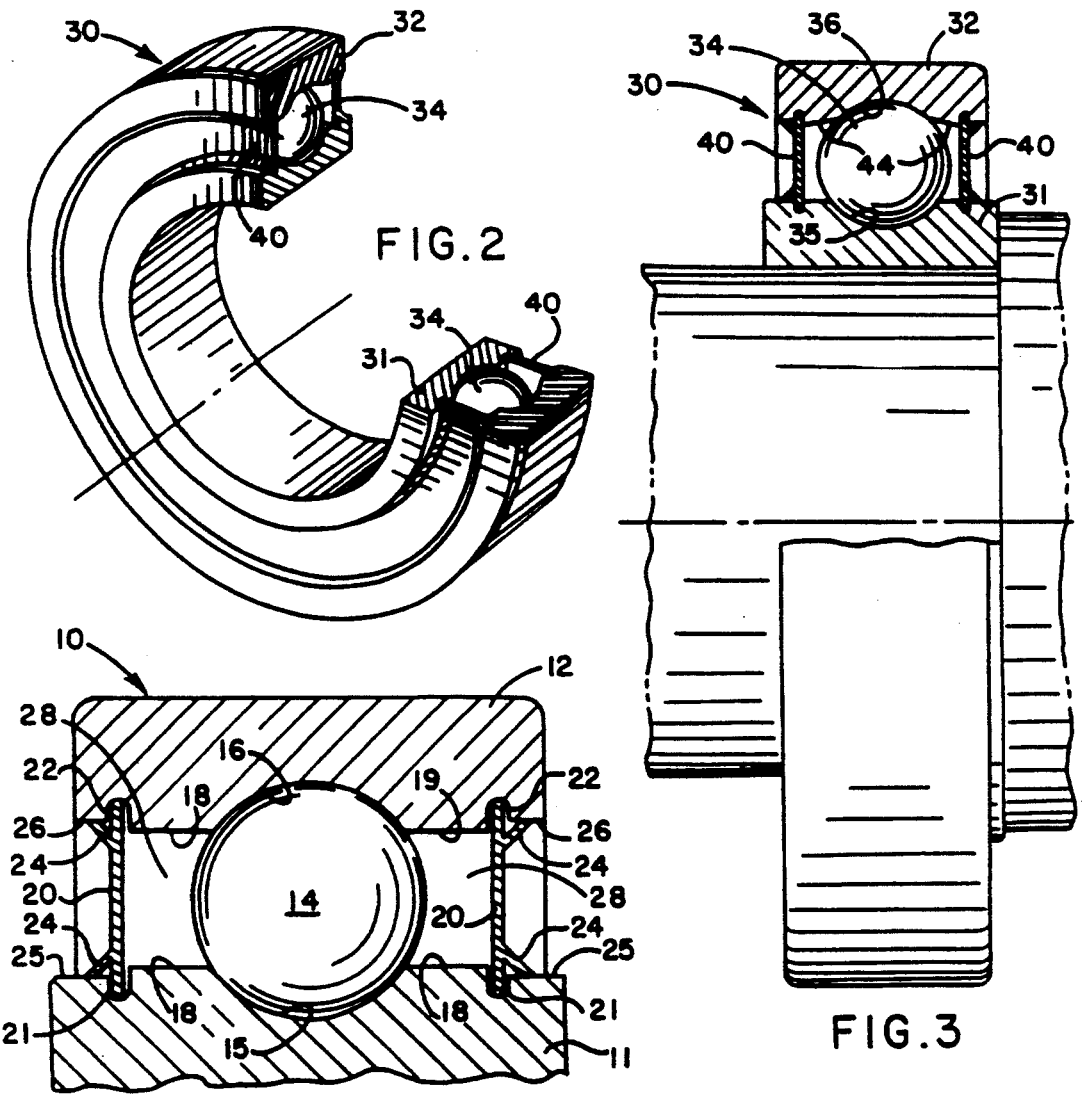
FIG. 2
FIG. 3
FIG. 1
(PRIOR ART)
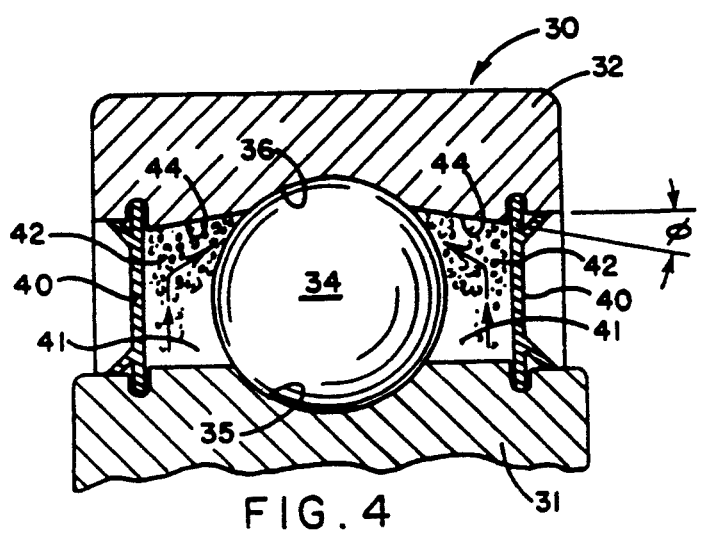
FIG. 4

BEARING WITH SPECIALLY SHAPED LANDS

CROSS-REFERENCE TO A RELATED APPLICATION

This application is a continuation-in-part of U.S. application Ser. No. 07/825,950, filed Jan. 27, 1992; now U.S. Pat. 5,199,798, issued Apr. 6, 1993.

FIELD OF THE INVENTION

The present invention relates generally to bearing assemblies, and more particularly, to bearing assemblies having inner and outer races separated by a plurality of balls or other rolling elements.

BACKGROUND OF THE INVENTION

Ball bearing assemblies typically comprise inner and outer races each formed with an opposed annular raceway within which ball elements are located for relative rolling movement. Annular seals are fixed between the inner and outer races on opposite axial sides thereof for defining an internal annular compartment within which the balls are disposed and within which lubricant is confined. It is desirable that such bearing assemblies have long service life since failure of the bearing commonly necessitates the costly disassembly and repair of the machinery or device with which the bearing is used. Prolonged usage of such bearings, nevertheless, often results in bearing failure. While reasons are not completely understood, the inability to maintain the relative moving bearing parts in an adequately lubricated condition, resulting in overheating and mechanical deformation and damage, often is believed to be the cause of failure. Hence, the need has existed for ball and like roller bearing assemblies with improved service life.

OBJECT AND SUMMARY OF THE INVENTION

It is an object of the present invention to provide a ball or like roller bearing assembly with improved service life.

Another object is to provide a bearing assembly as characterized above which is adapted for more effectively maintaining the relative moving bearing parts in an adequately lubricated condition for preventing overheating and mechanical deformation and damage.

A further object is to provide a bearing assembly of the above kind which has a relatively simple construction and which lends itself to economical manufacture and reliable, prolonged usage.

Other objects and advantages of the invention will become apparent upon reading the following detailed description and upon reference to the drawings, in which:

BRIEF DESCRIPTION OF THE DRAWINGS

FIG. 1 is a vertical section of a conventional ball bearing assembly of the type to which the present invention is an improvement;

FIG. 2 is a perspective, with a portion broken away, of one embodiment of a bearing assembly incorporating the features of the present invention;

FIG. 3 is an enlarged side elevational view, in partial section, of the bearing assembly shown in FIG. 2;

FIG. 4 is an enlarged fragmentary section of the bearing assembly shown in FIGS. 2 and 3;

Figure 5:
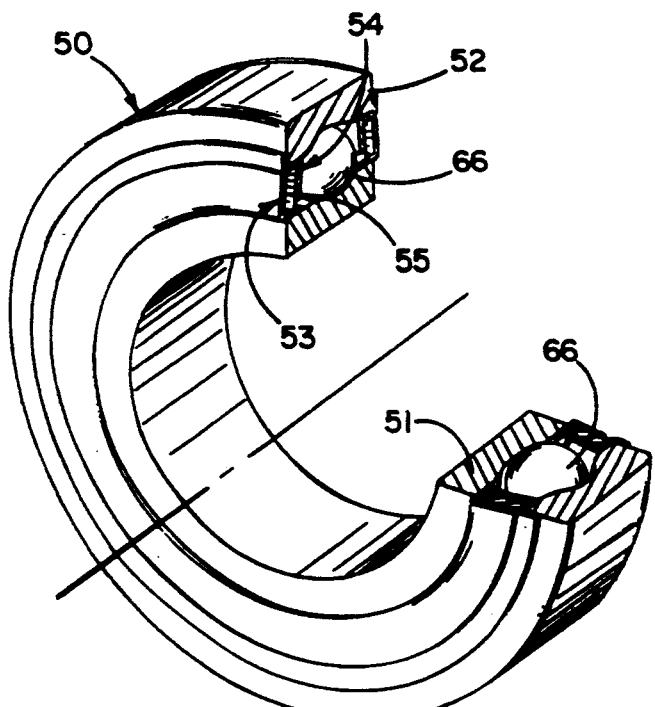
FIGS. 5 and 6 are views generally similar to FIGS. 2 and 4, respectively, but show a second embodiment of a bearing assembly incorporating the features of the invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DESCRIPTION OF THE PREFERRED EMBODIMENTS

Referring now more particularly to FIG. 1 of the drawings, there is shown a conventional ball-type rolling element bearing assembly 10 to which the present invention is an improvement. The bearing assembly 10 comprises inner and outer bearing races 11, 12 which capture a complement of bearing balls 14 therebetween. The inner and outer races 11, 12 are formed with opposed curved raceways 15, 16 within which the balls 14 are located for relative rolling movement. The inner and outer bearing races 11, 12 are formed with respective lands 18, 19 which extend outwardly on opposite axial sides of the raceways 15, 16 and between which disc-shaped sealing rings 20 are interposed. For retaining the sealing rings 20, the lands 18, 19 are formed with annular grooves 21, 22 for retaining inner and outer peripheral edges, respectively, of the sealing rings 20. For facilitating retention of the sealing rings 20 in mounted position, the inner and outer peripheral portions of each sealing ring 20 are formed with a respective outwardly flared retention flange 24 for engaging an outwardly exposed cylindrical lip 25, 26 of the respective bearing race 11, 12. The lands 18,19 which extend axially outwardly of the raceways 15, 16 in parallel relation to the axis of the bearing races, together with the sealing discs 20 define chambers 28 on opposed sides of the balls 14 for retaining lubricant and for excluding outside contaminants. Not withstanding such lubrication, as indicated above, bearing assemblies of such type still have been susceptible to failure after prolonged usage, which can result in costly repairs to the machinery or device with which the bearing is employed.

In accordance with the invention, a bearing assembly 30 is provided which has an improved service life. With reference to FIGS. 2–4, the bearing assembly 30 comprises co-axially disposed inner and outer bearing races 31, 32, a plurality of interposed balls 34 which ride in respective raceways 35, 36 in the inner and outer race 31, 32, and annular sealing discs 40 interposed between the inner and outer races 31, 32 on opposite axial sides of the balls 34 in spaced relation thereto for defining annular chambers 41 within which lubricant 42 is confined. The inner bearing race 31, balls 34, and sealing discs 40 in this instance are substantially similar to those previously described.

In carrying out the invention, the lands of one of said bearing races extend axially outwardly from the rolling elements in similarly tapered relation to the axis of said inner and outer races for facilitating circulation of lubricant during relative movement of said inner and outer races. More particularly, the lands are tapered in a radial direction opposite to that to which the raceway extends into the bearing race. In the illustrated embodiment, lands 44 of the outer bearing race 32 are formed with a slight taper with respect to the axis of the bearing races such that they extend axially outwardly from the raceway 36 of the outer race 32 with a radially inwardly directed taper. Each land 44 in this instance is tapered at an angle Φ of about 10° to the bearing axis. Bearing assemblies with such tapered lands 44 in the outer bearing race 36 have been found to have significantly improved service life over conventional bearing assemblies of the type shown in FIG. 1.

While the theory of operation is not entirely understood, it is believed that the tapered lands 44 tend to facilitate recirculation of the lubricant 42 contained within the sealed compartments 41 by assisting in the redirection of the lubricant about the balls 34, as depicted by the arrows in FIG. 4. Such circulatory movement of the lubricant 42 under the influence of gravity and/or centrifugal forces imparted by relative movement of the bearing parts is enhanced as the temperature of the lubricant increases as a result of prolonged operation, thereby further enhancing the ability of the lubricant to maintain the relative moving bearing parts in sufficiently lubricated condition for preventing mechanical damage and bearing failure.

Comparative testing between conventional bearing assemblies of the type shown in FIG. 1 and similarly configured bearing assemblies with tapered outer lands in accordance with the present invention have demonstrated markedly improved service life of the later bearings. In a test of eight bearings of each type under similar operating conditions, the table below compares the bearings in each group in the order of their life during the test. The L-10 life represents the number of hours that 90 percent of the bearings of each group surpassed. As can be seen, the L-10 life for the bearings with the tapered outer lands was 830 hours, versus 389 hours for the conventional bearings. The average life (L-AVG.) for the bearings with the tapered lands was 17,838 hours, versus an average life of 6,975 hours for the conventional bearings.

| BRG. NO. | CONVENTIONAL BEARINGS | BEARING WITH TAPERED OUTER LANDS | |
| --- | --- | --- | --- |
| 1 | 850.7 HRS | 1,200.2 HRS | |
| 2 | 1,035.2 HRS | 3,352.9 HRS | |
| 3 | 1,445.9 HRS | 3,488.8 HRS | |
| 4 | 2,620.9 HRS | 3,981.4 HRS | |
| 5 | 3,253.6 HRS | 11,288.6 HRS | SUSPENDED |
| 6 | 3,458.8 HRS | 27,276.3 HRS | |
| 7 | 13,307.7 HRS | 46,059.8 HRS | |
| 8 | 29,797.4 HRS | 46,059.8 HRS | |
| L10 | 389.0 HRS | 830.0 HRS | |
| L50 | 3,996.0 HRS | 12,600.0 HRS | |

Hence, it can be seen that the bearing assemblies of the present invention have significantly improved service life over conventional bearings. Yet, such bearing assemblies are relatively simple in construction and lend themselves to economical manufacture and reliable long term usage. While a ball bearing assembly in accordance with the invention has been shown and described herein, the invention also is applicable to other types of bearings, such as cylindrical roller bearings and needle roller bearings.

Figure 6:
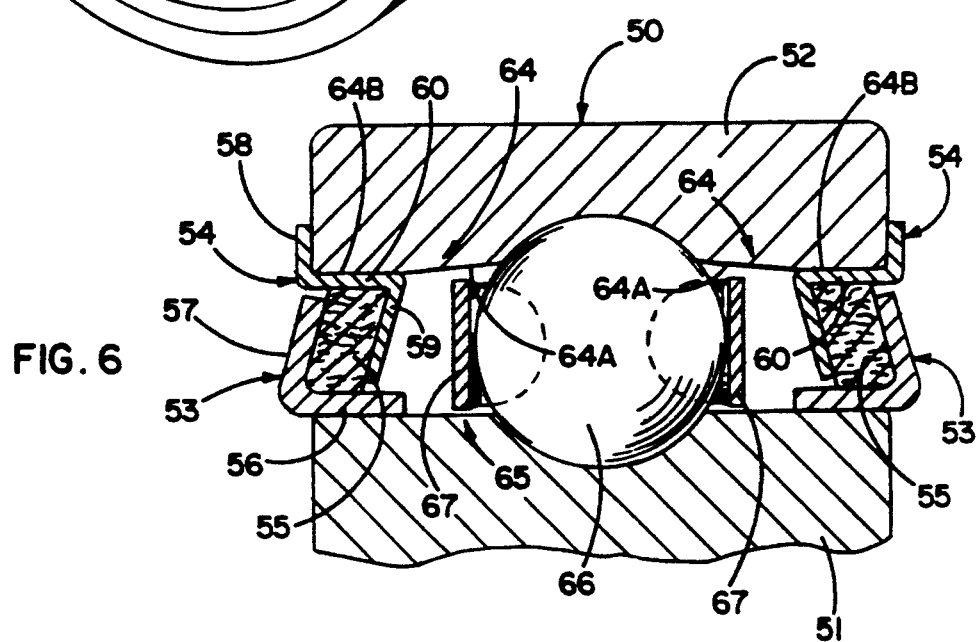
Figure 7:
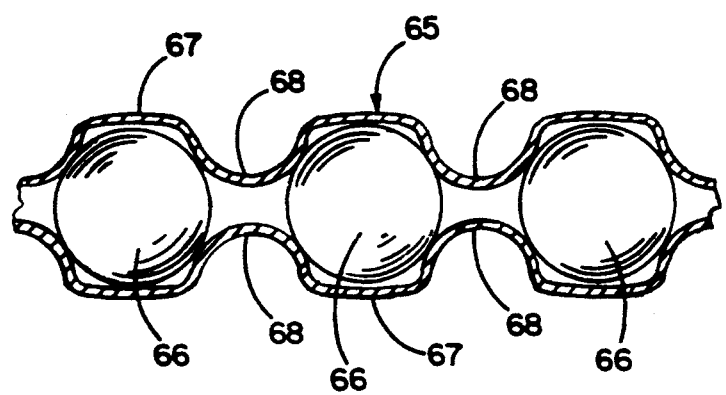
FIG. 7 is a roll out view of a portion of the bearing assembly shown in FIGS. 5 and 6.

Another embodiment of a bearing assembly 50 in accordance with the invention is shown in FIGS. 5–7 and utilizes a different type of sealing means at opposite axial sides of the raceways 51 and 52. Herein, each sealing means comprises inner and outer retainers or rings 53 and 54 which captivate a sealing element 55 of rectangular cross-section and made of felt, rubber or other flexible sealing material. Each inner ring 53 is generally L-shaped in cross-section and includes a flange 56 secured to the inner race 51. A second flange 57 is formed integrally with the flange 56 and extends along the outboard side of the adjacent sealing element 55.

Each outer retainer ring 54 is generally Z-shaped in cross-section and includes a first flange 58 extending alongside and secured to the outboard side of the outer race 52. Another flange 59 extends along the inboard side of the sealing element 55. The two flanges 58 and 59 are integrally joined by a web 60 extending substantially parallel to the axis of the inner and outer bearing races 51 and 52 and sandwiched between the land 64 of the outer race and the outer periphery of the sealing element.

Pursuant to the invention, each land 64 of the outer race 52 of the bearing assembly 50 of the embodiment of FIGS. 5–7 is formed not only with a tapered portion 64A as before but also is formed with a straight outboard portion 64B which extends parallel to the axis of the inner and outer races 51 and 52 and thus extends parallel to the adjacent web 60 of the retaining ring 54. As a result, the web 60 lies face-to-face against the straight portion 64B of the land 64 to provide a solid and stable seat for the web and to reduce the likelihood of lubricant seeping through the interface between the web and the straight portion. While the portion 64B of each land 64 parallels the axis of the races 51 and 52, the portion 64A is, as before, tapered at an angle of about 10° relative to the bearing axis. Thus, the tapered land portions 64A tend to facilitate recirculation of the lubricant in the same manner as described in connection with the first embodiment. At the same time, the straight portions 64B provide mating seats for the webs 60 of the rings 54.

The bearing assembly 50 of FIGS. 5–7 also includes a cage 65 (FIG. 7) which keeps the balls 66 in circumferentially spaced relation and which confines the balls axially. In this instance, the cage comprises a pair of annular retainer elements or discs 67 disposed on opposite axial sides of the balls 66 and acting to confine the balls axially. Between adjacent balls, each disc is deformed inwardly so as to define a dimple 68 for keeping the balls in circumferentially spaced relation. During relative rotation of the races 51 and 52, the cage floats radially between the races.

Figure 8:
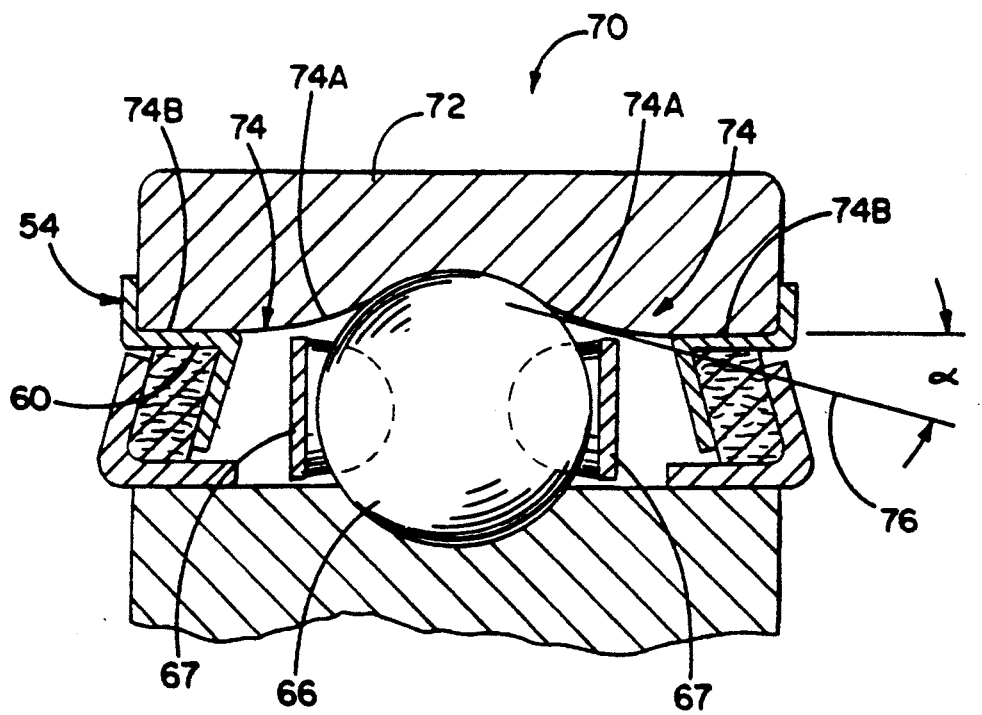
FIG. 8 is a view similar to FIG. 6 but shows another embodiment of a bearing assembly.

Another version of a bearing assembly 70 is shown in FIG. 8 and, in this instance, each land 74 of the outer bearing race 72 includes a generally tapered inboard portion 74A and a straight outboard portion 74B. As in the embodiment of FIGS. 5–7, the straight outboard portion defines a mating seat for the web 60 of the retainer ring 54.

While being generally tapered, the tapered portion 74A of each land 74 of the bearing 70 of FIG. 8 also is formed with a convexly curved contour. In the bearing of FIG. 8, the curvature is relatively gradual and thus a tangent 76 to the curved contour of the land portion 74A is inclined at an angle α of about 10° relative to the straight outboard portion 74B. The curved contour results in a smoother transition between the tapered and straight portions 74A and 74B.

Figure 9:
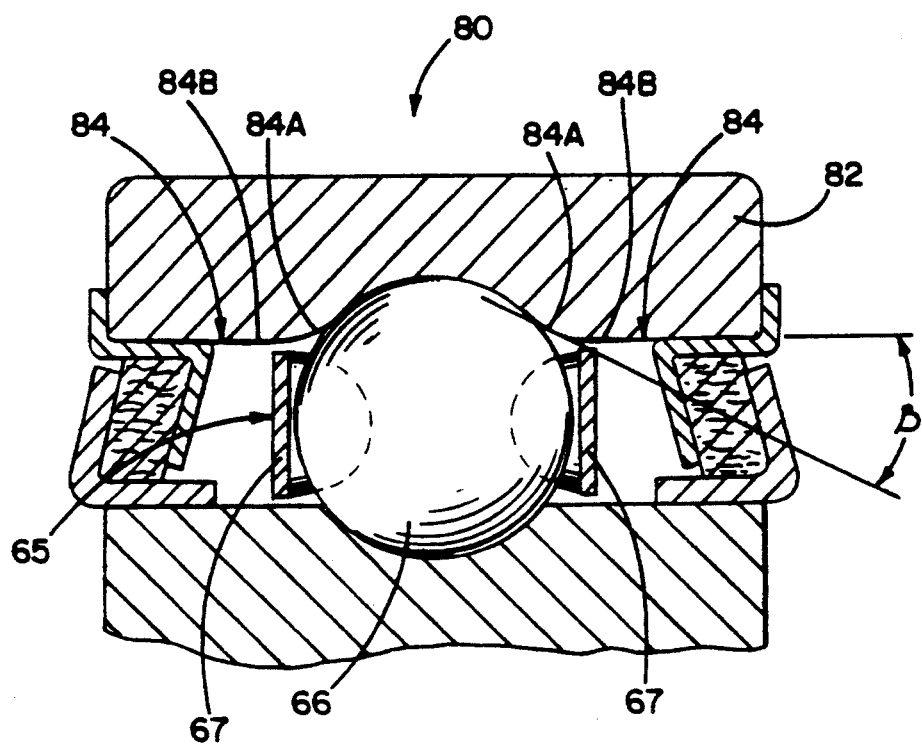
FIG. 9 is another view similar to FIG. 6 but shows still another embodiment of a bearing assembly.

Still another version of a bearing assembly 80 is shown in FIG. 9 and, like the bearing assembly 70 of FIG. 8, each land 84 of the outer bearing race 82 includes a straight outboard portion 84B and a generally tapered inboard portion 84A which is formed with a convexly curved contour. The curved contour of the inboard portion 84A of each land 84, however, is significantly sharper than the curved contour of the inboard portion 74A of each land 74 of the bearing 70. As shown in FIG. 9, a tangent 86 to the curved contour of the inboard portion 84A of each land 84 is inclined at an angle β of about 25° relative to the adjacent outboard straight portion 84B. With this arrangement, the retainer discs 67 of the cage 65 are spaced axially outwardly of the tapered contoured portions 84A of the lands 84 and their outer peripheries are located in opposing relation with the straight outboard portions 84B. As a result, when the cage 65 floats radially outwardly, the outer peripheries of the discs 67 engage and mate with the similarly shaped and concentric outboard land portions 84B rather than engaging an angled or curved surface. Thus, wear, binding, etc. resulting from engagement of the cage with the lands are reduced.

From the foregoing, it will be apparent that the embodiments of FIGS. 5–9 have lands which are particularly well suited for use with sealing means having an outer retainer ring 54 with a straight intermediate web 60. Also, the curved contours of the lands of the embodiments of FIGS. 8 and 9 provide a smooth transition with the straight outboard portions. In the embodiment of FIG. 9, the contoured portions 84A are located inboard to such an extent that the outer peripheries of the discs 67 ride against similarly shaped surfaces defined by the straight outboard land portions 84B.

What is claimed is:

1. A bearing assembly comprising
   inner and outer bearing races disposed in co-axial relation to each other for relative rotational movement,
   a plurality of rolling elements interposed between said inner and outer races,
   said bearing races each being formed with lands extending outwardly from opposite axial sides of said rolling elements,
   annular sealing means between said inner and outer races on opposite axial sides thereof,
   said lands and annular sealing means defining annular chambers on opposite axial sides of said rolling elements,
   a quantity of lubricant within said chambers for lubricating said rolling elements and said inner and outer bearing races for facilitating relative movement, and
   said lands of at least one of said bearing races extending axially outwardly from said rolling elements in similarly generally tapered relation to the axis of said inner and outer races for facilitating circulation of said lubricant during relative movement of said inner and outer races, said generally tapered lands being formed with similar convexly curved contours.

2. The bearing assembly of claim 1 in which said lands of said one race each include a straight contour merging with and located axially outboard of said curved contour and extending substantially parallel to the axis of said inner and outer bearing races.

3. The bearing assembly of claim 2 in which said annular sealing means comprise retaining rings each having a substantially straight surface extending substantially parallel to the axis of said inner and outer bearing races, the straight surfaces of said rings lying face-to-face against the straight contours of the lands of said one race.

4. The bearing assembly of claim 3 in which each of said rings is generally Z-shaped in cross-section.

5. The bearing assembly of claim 4 in which a tangent to each curved contour is inclined at an angle of about 10° to the adjacent straight contour.

6. The bearing assembly of claim 2 in which a tangent to each curved contour is inclined at an angle of about 25° to the adjacent straight contour.

7. A bearing assembly comprising
   inner and outer bearing races disposed in co-axial relation to each other for relative rotational movement,
   a plurality of rolling elements interposed between said inner and outer races,
   a cage disposed between said inner and outer races and having means disposed between said rolling elements, said cage having annular retainer elements on opposite axial sides of said rolling elements,
   said bearing races each being formed with lands extending outwardly from opposite axial sides of said rolling elements,
   annular sealing means between said inner and outer races on opposite axial sides thereof,
   said lands and annular sealing means defining annular chambers on opposite axial sides of said rolling elements,
   a quantity of lubricant within said chambers for lubricating said rolling elements and said inner and outer bearing races for facilitating relative movement,
   said lands of said outer bearing race having convexly curved inboard portions extending axially outwardly from said rolling elements for facilitating circulation of said lubricant during relative movement of said inner and outer races,
   said lands of said outer bearing race having outboard portions merging with said inboard portions and extending substantially parallel to the axis of said inner and outer bearing races, and
   said annular retainer elements having outer peripheries spaced axially outwardly from the curved inboard portions of the lands of said outer bearing race and disposed in opposing relation with the outboard portions of such lands.

8. The bearing assembly of claim 7 in which said annular sealing means comprise retaining rings each having a substantially straight surface extending substantially parallel to the axis of said inner and outer bearing races, the straight surfaces of said rings lying face-to-face against the outboard portions of said lands of said outer bearing race.

9. A bearing assembly comprising
   inner and outer bearing races disposed in co-axial relation to each other for relative rotational movement,
   a plurality of rolling elements interposed between said inner and outer races, said bearing races each being formed with lands extending outwardly from opposite axial sides of said rolling elements, annular sealing means between said inner and outer races on opposite axial sides thereof, said lands and annular sealing means defining annular chambers on opposite axial sides of said rolling elements, a quantity of lubricant within said chambers for lubricating said rolling elements and said inner and outer bearing races for facilitating relative movement, said lands of said outer bearing race having inboard portions extending axially outwardly from said rolling elements in similarly generally tapered relation to the axis of said inner and outer races for facilitating circulation of said lubricant during relative movement of said inner and outer races, and said lands of said outer bearing race having outboard portions merging with said inboard portions and extending substantially parallel to the axis of said inner and outer bearing races.

10. The bearing assembly of claim 9 in which said annular sealing means comprise retaining rings each having a substantially straight surface extending substantially parallel to the axis of said inner and outer bearing races, the straight surfaces of said rings lying face-to-face against the outboard portions of said lands of said outer bearing race.

11. The bearing assembly of claim 10 in which said generally tapered lands have straight contours.

12. The bearing assembly of claim 10 in which said generally tapered lands are formed with similar convexly curved contours.

13. The bearing assembly of claim 12 in which the convexly curved contour of each generally tapered land is relatively gradual such that a tangent to such contour is inclined at an angle of about 10° relative to the adjacent outboard portion of the land.

14. The bearing assembly of claim 12 in which the convexly curved contour of each generally tapered land is relatively sharp such that a tangent to such contour is inclined at an angle of about 25° relative to the adjacent outboard portion of the land.

* * * * *